United States Patent [19]
Pagdin

[11] 3,851,928
[45] Dec. 3, 1974

[54] BRAKING SYSTEMS

[75] Inventor: Brian Colin Pagdin, Sutton Coldfield, England

[73] Assignee: GKN Transmissions, Limited, Birmingham, England

[22] Filed: May 30, 1973

[21] Appl. No.: 365,190

[30] Foreign Application Priority Data
May 30, 1972   Great Britain............... 25170/72

[52] U.S. Cl. .................. 303/21 CG, 188/181 A
[51] Int. Cl. ............................................... B60t 8/16
[58] Field of Search ......... 303/21 CG, 21 B, 21 BB, 303/21 F; 73/515, 516 R; 188/181 A

[56] References Cited
UNITED STATES PATENTS

| | | | |
|---|---|---|---|
| 2,160,191 | 5/1939 | Fitch ............................. | 73/516 R X |
| 2,415,344 | 2/1947 | Eksergian ................... | 303/21 CG X |
| 2,920,924 | 1/1960 | Reswick et al................... | 73/515 X |
| 3,078,724 | 2/1963 | Gindes et al...................... | 73/516 R |
| 3,231,315 | 1/1966 | Turnbull............................ | 303/21 F |
| 3,322,471 | 5/1967 | Faiver et al. ................... | 303/21 CG |
| 3,379,288 | 4/1968 | Davis........................... | 303/21 CG X |

*Primary Examiner*—Duane A. Reger
*Assistant Examiner*—Gregory W. O'Connor
*Attorney, Agent, or Firm*—Spencer & Kaye

[57] ABSTRACT

The specification discloses an anti-skid braking system in which an inertial skid sinsor in the form of a flywheel mounted on a shaft is arranged, in response to a wheel deceleration in excess of a predetermined level indicating a skid condition, to reduce the braking torque exerted so as to relieve the skid condition, the flyhweel being arranged to be axially displaced relative to the shaft in response to a wheel deceleration in excess of the predetermined value, the axial movement of the flywheel being arranged to reduce the braking torque and being damped by a fluid damping means.

5 Claims, 5 Drawing Figures

BRAKING SYSTEMS

BACKGROUND OF THE INVENTION

1. Field of the Invention

This invention relates to inertial skid sensors for vehicles and to anti-skid braking systems including such sensors.

2. Description of the Prior Art

Many proposals have been made for vehicle anti-skid braking systems and some systems employ an inertial sensor comprising a flywheel mounted on a shaft driven at a speed proportional to one of the braked wheels of the vehicle and capable of rotation relative thereto in response to a wheel deceleration above a predetermined level indicating a skid condition. Means are provided in such sensors which, upon relative rotation between the shaft and the flywheel, operate a switch or other means to control a braking circuit in such a manner as to relieve the skid condition. For convenience in this specification we refer to a flywheel but intend to include within this term any suitable form of inertial mass.

Prior art sensors of the above construction were originally developed for use in aircraft where the servo systems are very sophisticated. Difficulty has been encountered, however, in applying such sensors to motor vehicles where very much simpler servo systems are employed and the sensors which are in commercial use have been complicated by the need to allow for the imperfections of these servo systems.

It is an object of the present invention to provide an inertial skid sensor which when associated with a braking system of a vehicle enables a greater average rate of retardation of the vehicle and therefore a shorter stopping distance to be obtained, as compared with known sensors, while avoiding skids.

SUMMARY OF THE INVENTION

According to the present invention we provide a vehicle anti-skid braking system including an inertial skid sensor comprising a shaft, a flywheel mounted on the shaft so as to be capable of movement about and parallel to the longitudinal axis of the shaft, co-operating cam means associated with the shaft and flywheel, resilient means biasing the co-operating cam means into mutual engagement so that relative rotation between the shaft and flywheel causes the cam means to displace the flywheel axially relative to the shaft, and fluid damping means for damping the axial movement of the flywheel relative to the shaft, the shaft of the sensor being arranged to be driven at a speed proportional to the speed of a braked wheel of the vehicle and arranged to extend substantially parallel to the longitudinal axis of the associated vehicle so that the axial movment of the flywheel, caused by the tendency of the flywheel to over-run the shaft in response to a wheel deceleration in excess of a predetermined level indicating a skid condition is opposed by the linear inertia of the flywheel, said axial movement of the flywheel being arranged to reduce the braking torque exerted so as to relieve the skid condition.

In a vehicle anit-skid braking system as described in the preceding paragraph the axial movement of the flywheel in the over-run condition be arranged to actuate a switch or other suitable means which in turn controls the braking torque.

When a vehicle fitted with such an anti-skid braking system is subjected to a wheel deceleration in excess of said predetermined level, indicating a skid condition, the flywheel is displaced on the shaft in order to actuate the switch so as to reduce the braking torque The shaft on which the flywheel is mounted thus speeds up in response to the reduction in the braking torque and the flywheel therefore returns to a position in which the switch is released and the braking torque again increases only to be reduced again by further axial displacements of the flywheel should the level of the wheel deceleration again exceed the predetermined level. During a given braked stop the flywheel will therefore be continually oscillating between positions at which the switch is actuated and positions at which it is not if the driver of the vehicle persists in selecting a level of braking torque which results in a wheel deceleration in excess of the predetermined level.

By providing a fluid damping means for damping the axial movement of the flywheel relative to the shaft the magnitude of the oscillations of the flywheel described above are reduced as the flywheel is less prone to overshoot the position of minimum axial movement at which the switch is actuated and is also not displaced so far from this position in the other direction each time the switch is released. Thus during a given braked stop the average level of braking torque exerted is higher and the stopping distance consequently smaller.

The fluid damping means can conveniently be provided by arranging the axial movement of the flywheel to force fluid through a flow restrictor.

The resilient means are preferably provided by a compression spring interposed between an abutment on the shaft and the cam means associated with either the shaft or flywheel. The cam means may, if desired, be arranged so as to cause movement of the flywheel both upon acceleration and deceleration of the braked wheel or wheels with which the shaft is associated. Thus if for example, the shaft were driven from the front wheels of a motor vehicle, the flywheel would normally prevent front wheel locking.

By mounting the flywheel so that it is capable of movement both longitudinally and rotationally relative to the shaft, the sensitivity of the sensor and therefore of the system is varied in dependence on the deceleration of the vehicle. Since the linear inertia opposes the movement of the flywheel occasioned by its rotary inertia, the opposing force due to the linear inertia will be greater when the deceleration of the vehicle is greater, for example when the vehicle brakes are applied on a good surface and less when the deceleration is less, for example when the vehicle brakes are applied on a slippery surface. Thus if the brakes are applied on a good surface there will be a delay in the operation of the sensor to relieve the braking pressure while this delay will not occur, or will be reduced, if the brakes are applied on a slippery surface. The sensitivity of the system is thus automatically varied in dependence on the deceleration of the vehicle as distinct from the deceleration of the wheels.

Moreover, the invention allows the construction of a sensor which is mechanically simpler than those at present in use. Thus the flywheel itself can be used to operate the switch which controls the braking system to relieve the brake pressure.

In a four wheel drive vehicle, a single inertial skid sensor can be connected to the drive shaft for the front or rear wheels. In such a four wheel drive vehicle there will normally be inter-axle, controlled-slip differential or other torque transmitting device for apportioning the engine torque unequally between the front and rear wheels and operable to re-route some of the torque in the event of spinning of the wheels. Normally the arrangement is that the major part of the torque is directed to the rear wheels so that the vehicle has handling characteristics approximating to those of a conventional rear wheel drive vehicle, and there are therefore advantages in connecting the skid sensor to the front wheel drive shaft in order to prevent front wheel locking with its resultant rapid loss of steering control. In such an arrangement if the rear wheels spin then some of the torque is re-routed to the front wheels. However, if one wished to have a four wheel drive vehicle in which the front axle was the dominant axle, i.e. the handling characteristics of the vehicle approximated to that of a front wheel drive conventional vehicle, the torque-splitting arrangement between the front and rear wheels would allocate the greater part of the torque to the front wheels and in this case the skid sensor could be driven from the rear wheel drive shaft.

BRIEF DESCRIPTION OF THE DRAWINGS

An embodiment of the invention will now be described in detail by way of example with reference to the accompanying drawings in which.

DESCRIPTION OF THE PREFERRED EMBODIMENT

Figure 1:
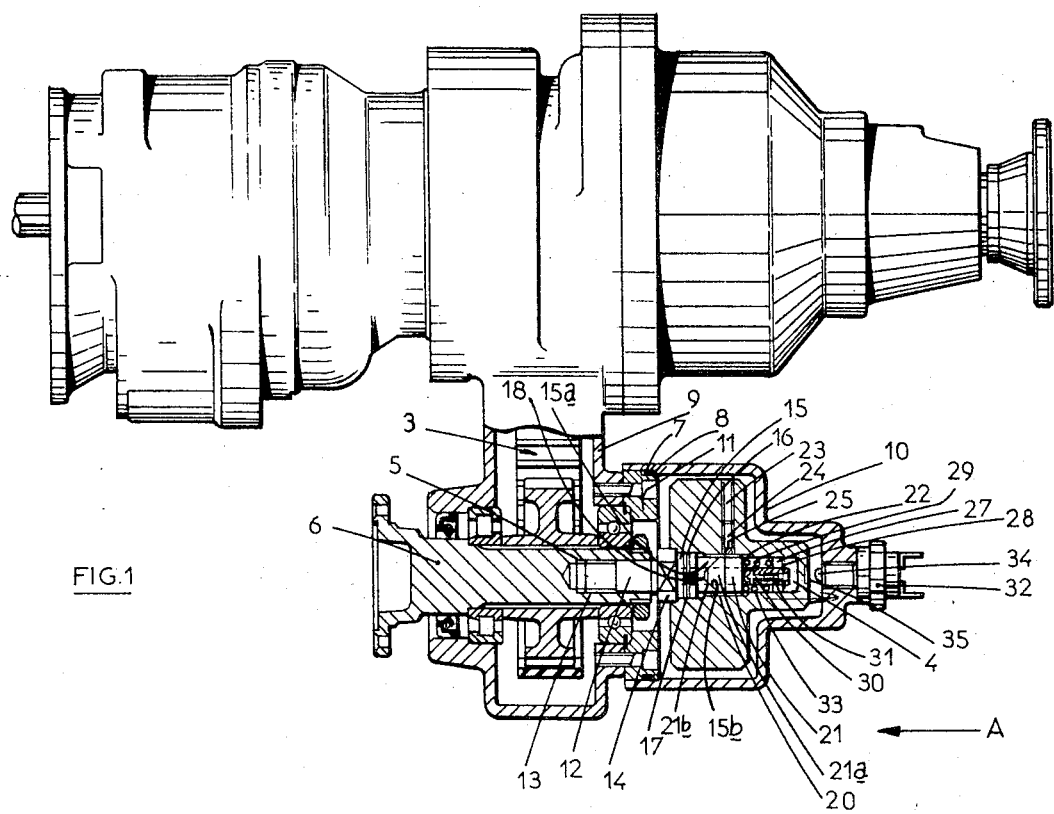
FIG. 1 is a plan view showing an inertial skid sensor in section secured to a transfer drive of a four wheel drive vehicle.

Referring to FIG. 1, an inertial skid sensor comprises a bell shaped housing 10 provided with a detachable internal flange 11 whereby the housing can be secured to a casing 9 of a transfer drive 3 in a four wheel drive vehicle. The housing 10 and flange 11 are secured together by a number of screws (not shown) which are accessible from thhe exterior of the housing. An O-ring 7 received in a groove 8 provided in the flange 11 seals the joint between the flange and the housing against the egress of oil.

A shaft 12 is received within the housing. It will be noted that the shaft 12 is not carried in any bearings within the housing and is in fact cantilevered from a drive shaft 6 for the front wheels of the vehicle. For this purpose, the shaft 12 is provided with an external screw thread 13 at one end which is threaded into an internally threaded recess 5 in the end of the drive shaft. By connecting the shaft 12 to the front wheel drive shaft 6 the shaft 12 is driven at a speed proportional to the speed of rotation of the front wheels of the vehicle and, by virtue of the interconnection between the front and rear wheels in a four wheel drive vehicle, the shaft 12 is also rotated at a speed proportional to that of the rear wheels of the vehicle.

Intermediate its ends, the shaft 12 is formed with an abutment 14 which is of hexagon shape whereby the shaft may be gripped during assembly of the sensor. Secured to the shaft and engaging the abutment 14 is a sleeve 15 which is fixed to rotate with the shaft and which is provided with a groove 16 in which is received a ring seal 17. The righthand end of the sleeve 15 is formed with one part 15a of co-operating cam means indicated generally at 18.

A bell-shaped flywheel 19 surrounds the right hand end of the shaft and has a bore 20 in which the sleeve 15 is received and against which the seal 17 operates thus forming a sealed chamber 4 which is filled with viscous fluid.

A further sleeve 21 surrounds the shaft with clearance and at its left hand end it carries the other part 21a of the cam means 18. The arrangement is such that upon relative rotation of the sleeves 15 and 21 the sleeve 21 moves axially away from the sleeve 15 due to the co-operation of cam surfaces 15b and 21b provided on the adjacent ends of the sleeves 15 and 21 respectively. The sleeve 21 is externally threaded and engages an internal thread 22 in the bore 20. The flywheel is provided with a transverse bore 23 which is internally threaded and receives a lock screw 24 which at its inner end carries a resilient pad 25 made of a suitable synthetic polymeric material, e.g. nylon.

Adjacent the right hand end of the shaft 12 is mounted a washer 27 which is held on the shaft by circlip 28 received in a groove in the shaft. The washer is a reasonably close fit in the bore 20 and functions as a piston dividing the sealed chamber 4 into two portions one on either side of the washer. The shaft is provided with a transverse bore 29 which communicates with a counter-bore 30 which in turn contains a fluid flow restrictor in the form of a metering jet 31. The bore 29 and 30 thus place both portions of the sealed chamber in communication via the metering jet 31. If desired, as an alternative to the bore arrangement described above, the two portions of the sealed chamber can be placed in communication via a passage or passages formed in the washer, the or each passage being arranged to restrict the flow of fluid therethrough.

A helical compression spring 33 is interposed between the washer 27 and the sleeve 21 thus pushing the latter to the left in the drawing and urging the co-operating cam means into engagement.

Figure 2:
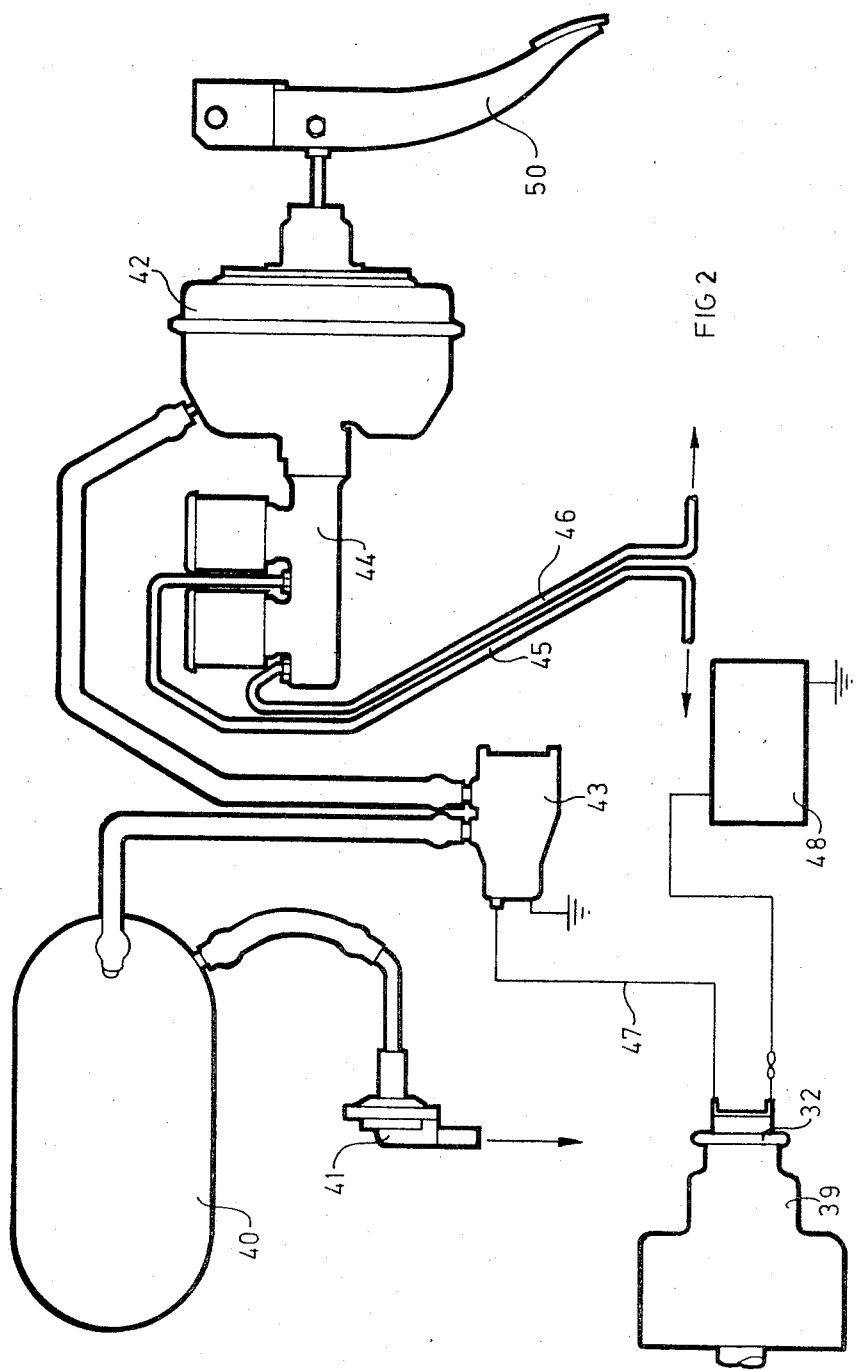
FIG. 2 is a schematic view of a four wheel drive motor vehicle anti-skid braking system including the inertial skid sensor shown in section in FIG. 1.

At its right-hand end, the housing 10 is provided with an electric switch 32 which is arranged to control the opeation of an anti-skid braking system, see FIG. 2, of which the sensor forms a part. The flywheel is provided with a pad 35 at its right hand end to engage a button 34 of the switch.

The sensor is assembled on the bench by gripping the shaft 12 by the abutment 14 and then fixing the sleeve 15 thereon. The sleeve 21 is then placed on the shaft followed by the spring 33, the washer 27 and the circlip 28. The thickness of the washer 27 serves to adjust the spring force on the sleeve 21 and therefore the force required to displace the sleeve 21 and the flywheel to the right.

The flywheel is next placed in position without the screw 24 and the whole of the bore 20 is filled with fluid on both sides of the piston provided by the washer 27. The flywheel 19 is then rotated and by virtue of the threads on the flywheel and the sleeve 21 the flywheel moves to the left thus expelling fluid from the bore 20 through the bore 23. When the flywheel is in the desired position the plug 24 is inserted and tightened home so that the pad 25 engages the sleeve 21 and prevents any relative rotation between the sleeve and the flywheel.

The sensor is mounted on a vehicle by bolting the flange 11 to the transfer drive casing 9, engaging the shaft 12 in the end of the front wheel drive shaft, placing the O-ring 7 in position in the groove 8 in the flange 11, and the placing the housing 10 over the flange 11 and screwing it thereto. The sensor is thus mounted on the vehicle so that the threaded end 13 of the shaft 12 points forwardly as indicated by the arrow A and by virtue of the previously described interconnection between the front and rear wheels of the vehicle, the shaft 12 is driven at a speed proportional to that of the front and rear wheels of the vehicle.

Assuming that the vehicle is travelling at a steady speed the flywheel 19 will be rotating at the same speed as the shaft 12, the flywheel being driven through the co-operating cam means 18 which are held in engagement by the spring 33. If now the vehicle brakes are applied so that the angular velocity of the front wheels decreases and the vehicle decelerates the angular velocity of the shaft 12 will also decrease. Should the wheel deceleration exceed a predetermined level, discussed below, the rotary inertia of the flywheel 19 will cause it to rotate relative to the shaft 12. Upon such relative rotation the cam means 18 cause the flywheel 19 to move to the right. This movement to the right is opposed by the spring 33, by the viscous damping due to the fact that the sleeve 21 has to displace fluid through the bores 29 and 30 and the metering jet 31, by the friction between the seal 17 and the bore 20, by the linear inertia of the flywheel and also by the force required to operate the switch which will normally be spring loaded. All these factors thus determine the level of wheel deceleration at which the flywheel is axially displaced on the shaft. This level of deceleration is a predetermined compromise value at which it is assumed the vehicle wheels will skid and is chosen taking into account the range of surface conditions, for example a good dry road or an icy road, on which the vehicle is expected to be operated.

If during a given braked stop the level of wheel deceleration exceeds the predetermined level, the flywheel will be axially displaced on the shaft, as previously described, in order to reduce the braking toque. Following the reducing in the braking torque the shaft on which the flywheel is mounted speeds up and thus when the level of braking torque has been reduced sufficiently the flywheel returns under the action of the spring 33, to a position in which the switch is released and the braking torque can again increase only to be reduced again by further axial displacements of the flywheel should the level of wheel deceleration again exceed the predetermined level. During a given braked stop the flywheel will therefore be continually oscillating between positions at which the switch is actuated and positions at which the switch is not actuated if the driver of the vehicle persists in selecting a level of braking torque which results in a wheel deceleration in excess of the predetermined level.

By providing viscous damping of the axial movements of thhe flywheel the magnitude of the flywheel oscillations is greatly reduced as the flywheel is less prone to overshoot the position of minimum axial movement at which the switch is operated and is not displaced so far from this position each time the switch is released.

Figure 3:
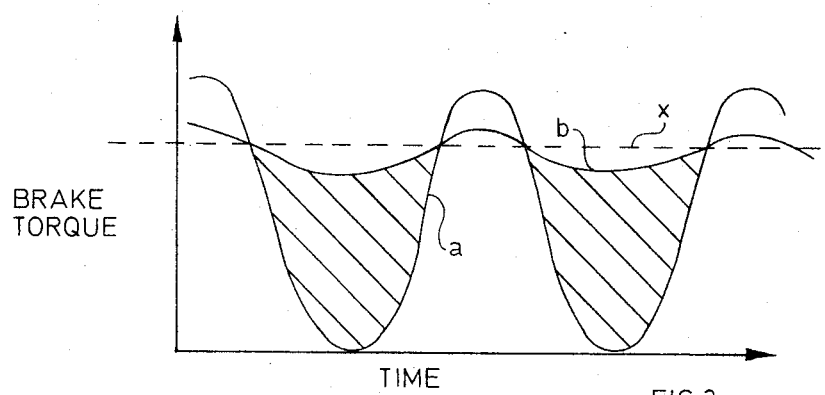
FIG. 3 is a graph of brake torque against time for an anti-skid braking system controlled by a fluid-damped inertial skid sensor and also an anti-skid braking system controlled by an undamped inertial skid sensor.

The combined effects of flywheel oscillation and overshoot can be seen in FIG. 3 which shows a typical graph of brake torque against time for an anti-skid braking system controlled by an undamped flywheel, shown by curve a, and by a viscous-fluid-damped flywheel, shown by curve b. Curves a and b represent the system's ability to maintain a selected level of brake torque during part of a given brake application. The reduction in overall braking efficiency of the system, and consequent increase in stopping distance, when controlled by an undamped flywheel can be seen from FIG. 3. The shaded areas of this Figure indicate the periods during which, due to the flywheel repeatedly overshooting the position of minimum axial movement required to operate the switch, the brakes are operating at lower torque values than if they were controlled by a viscous fluid damped flywheel. As the fluid damping controls the axial movement of the flywheel in both directions the peaks of the brake torque curve of the system when controlled by a damped flywheel are also lower and closer to the selected torque value $x$. Clearly the system maintains the braking torque closer to the selected value $x$ when the flywheel is damped.

Figure 4:
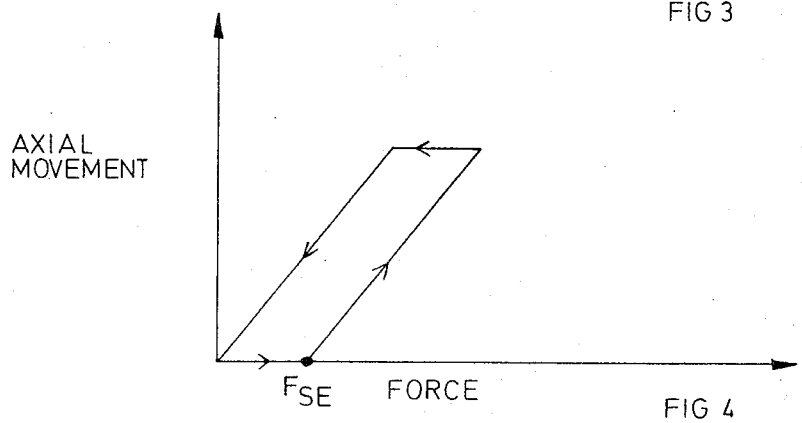
FIG. 4 is a graph of the axial movement of a flywheel which forms part of the inertial skid sensor shown in FIG. 1 against the force applied to the flywheel and FIG. 5 is a graph of vehicle deceleration against time showing the behaviour of a vehicle whose anti-skid braking system is controlled by a damped inertial skid sensor and a vehicle whose anti-skid braking system is controlled by an undamped inertial skid sensor.

The friction between the seal 17 and the bore 20 modifies what would otherwise be a linear force/axial movement curve for the flywheel to a curve of hysteresial form, as shown in FIG 4. This occurs because of the axial force $F_{SE}$ (see below) which must be applied to the flywheel in order to overcome the friction between the seal 17 and the bore 20 before the flywheel can begin its axial movement in either direction.

Figure 5:
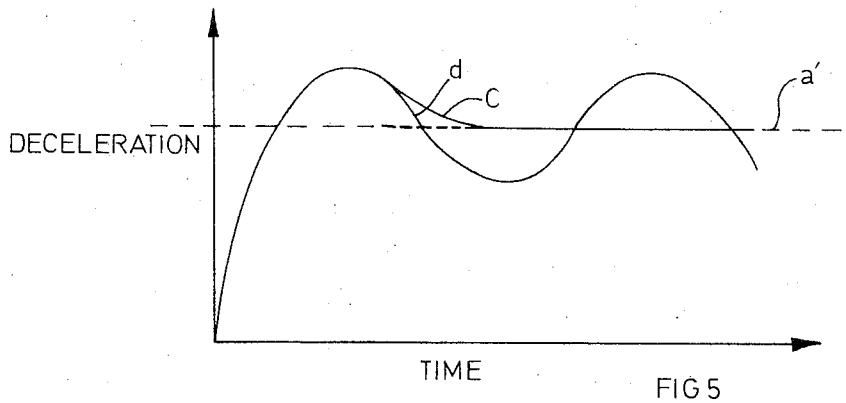

Ideally the damping of the flywheel should be adjusted to be critical, as shown in FIG. 5, so that the vehicle deceleration reaches a selected value $a'$ with one small overshoot as shown by curve c and does not oscillate about the selected value as would be the case if the flywheel were undamped. The deceleration/time curve of a vehicle fitted with an anti-skid braking system controlled by an undamped flywheel is shown for comparison at d in FIG. 5.

In addition to the restrictions on the axial movement of the flywheel described above, as the vehicle decelerates the linear inertia of the flywheel 10 will tend to make it move in the forward direction and therefore the force due to the linear inertia will oppose the movement of the flywheel to the right to operate the switch.

The equation of forces acting on the flywheel upon deceleration may be written as follows:

$$F_R = F_L + F_{SP} + F_V + F_{SE} + F_{SW}$$

in which $F_R$ is the force due to the rotary inertia and the angular deceleration of the flywheel, $F_L$ is the force due to the linear inertia and the linear deceleration of the flywheel, $F_{SP}$ is the force due to the spring, $F_V$ is the force due to the viscous damping, $F_{SE}$ is the force required to overcome the initial friction between the seal 17 and the bore 20, $F_{SW}$ is the force required to operate the switch.

This equation of forces can be written as follows:

$$F_R - F_L \approx C$$

While it is not strictly true that the spring force, the damping force, the seal force and the switch force together are constant they may be considered to be so far the purposes of the following discussion. From this simplified equation it will be seen that the force available from the flywheel to operate the switch depends upon the difference between the force due to the rotary inertia and the force due to the linear inertia of the flywheel. As described above, if the vehicle is on a slippery surface then one requires sensitive control of the braking system. In such a case $F_L$ will be small or zero and therefore there will be little or no resistance to the movement of the flywheel to the right to operate the switch to relieve the braking pressure.

If, however, the vehicle is being decelerated upon a good surface, the deceleration of the vehicle will be high and the forces $F_L$ due to the linear inertia of the flywheel will also be high and will therefore delay the release of the braking pressure thus enabling a good braking performance to be obtained.

FIG. 2 shows a four wheel drive motor vehicle anti-skid braking system including an inertial skid sensor 39 as described above. The system comprises a vacuum tank 40 connected to an intake manifold of the vehicle engine via a non-return valve 41. The vacuum tank is connected to a vacuum servo 42, operated by a foot pedal 50, via a solenoid operated brake control valve 43. The vacuum servo is in turn connected to a tandem master cylinder 44 the output lines 45 and 46 of which are connected to the front and rear wheel brakes of the vehicle respectively. The switch 32 of the skid sensor is connected in a line 47 connectiong a battery 48 to the solenoid of the brake control valve 43.

The system is arranged so that when the flywheel is axially displaced on the shaft, in response to a level of deceleration indicating a skid condition, the flywheel contacts the button 34 of the switch 32 thus connecting the solenoid of the brake control valve 43 to the battery 48. Energisation of the solenoid is arranged to cut off the communication between the vacuum tank 40 and the vacuum servo 42 thus releasing the vehicle brakes in order to relieve the skid condition.

The sensor itself is mechanically much simpler than the previously used types of sensor and the provision of fluid damping means to damp the axial movements of the flywheel relative to the shaft greatly improves the performance of the sensor as described above. As the shaft 12 is cantilevered from the drive shaft there is also no need to have any bearings in the housing 10 nor to seal the shaft in the housing. The shaft and flywheel run in the oil circulating in the transfer gearbox to which the housing 10 is secured.

It is simpler to change the spring force by varying the thickness of the washer 27 and also the viscous damping by changing the size of the metering jet 31. The sensor can therefore easily be adapted to different vehicles and arranged to operate at different levels of deceleration by variation of these items and also by varying the position of the flywheel 19 relative to the sleeve 21.

Although the skid sensor and anti-skid braking system provided by the present invention have been described above applied to a four wheel drive vehicle for which they are particularly suitable, as only a single sensor is required, it will be evident that the sensor and a suitably modified system are also applicable to any vehicle, no matter how driven, employing one or more braked wheels. In a conventional rear wheel drive motor vehicle, for example, the driven rear wheels which are interconnected via a differential may be provided with a single sensor and the front wheels of the vehicle may also be provided with separate skid sensors. Alternatively, if a less sophisticated system is acceptable, a single sensor may be used, driven, for example, from the vehicle transmission shaft.

I claim:

1. A vehicle anti-skid braking system including an inertial skid sensor comprising a flywheel mounted on a shaft for movement about and parallel to the longitudinal axis of the shaft, a sealed chamber containing a viscous fluid within the flywheel into which the shaft extends, the portion of the shaft within the chamber being provided with a piston which divides the chamber into two portions, a fluid passageway between said chamber portions incorporating a fluid flow restrictor, two sleeves encircling a portion of the shaft within the chamber, the sleeves being arranged in end to end configuration and adjacent ends of the sleeves being provided with co-operating cam surfaces, one sleeve being connected with the shaft and the other being in screw-threaded engagement at its outer periphery with an internally screw-threaded portion of the wall of the chamber so that the relative axial positions of said other sleeve and the flywheel can be adjusted, locking means carried by the flywheel in order to lock the flywheel and said other sleeve in a fixed axial relationship, and resilient means biasing the co-operating cam surfaces into mutual engagement so that relative rotation between the shaft and flywheel causes the cam surfaces to displace the flywheel axially relative to the shaft, said axial movement of the flywheel relative to the shaft being damped by displacement of the viscous fluid from one portion of the chamber to the other via the flow restrictor, the sensor being arranged to be driven at a speed proportional to the speed of a braked wheel of the vehicle and arranged to extend substantially parallel to the longitudinal axis of the associated vehicle so that the axial movement of the flywheel caused by the tendency of the flywheel to over-run the shaft in response to a wheel deceleration in excess of a predetermined level indicating a skid condition is opposed by the linear inertia of the flywheel, said axial movement of the flywheel being arranged to reduce the braking torque exerted so as to relieve the skid condition.

2. A vehicle anti-skid braking system according to claim 1, in which the locking means comprises a locking screw disposed in a screw-threaded bore in the flywheel extending substantially at right angles to the longitudinal axis of the shaft, the locking screw being arranged to make clamping engagement with the outer periphery of the screw-threaded sleeve thus securing the sleeve and flywheel in a fixed axial relationship.

3. A vehicle anti-skid braking system including an inertial skid sensor comprising a flywheel mounted on a shaft for movement about and parallel to the longitudinal axis of the shaft, a sealed chamber containing a viscous fluid within the flywheel into which the shaft extends, the portion of the shaft within the chamber being provided with a piston which divides the chamber into two portions, a fluid passageway between said chamber portions incorporating a fluid flow restrictor, two sleeves encircling a portion of the shaft within the chamber, the sleeves being arranged in end to end configuration and adjacent ends of the sleeves being provided with co-operating cam surfaces, one sleeve being connected with the shaft and the other with the flywheel, resilient means biasing the co-operating cam surfaces into mutual engagement so that relative rotation between the shaft and flywheel causes the cam surfaces to displace the flywheel axially relative to the shaft, said axial movement of the flywheel relative to the shaft being damped by displacement of the viscous fluid from one portion of the chamber to the other via the flow restrictor, the sensor being arranged to be driven at a speed proportional to the speed of a braked wheel of the vehicle and arranged to extend substantially parallel to the longitudinal axis of the associated vehicle so that the axial movement of the flywheel caused by the tendency of the flywheel to over-run the shaft in response to a wheel deceleration in excess of a predetermined level indicating a skid condition is opposed by the linear inertia of the flywheel, said axial movement of the flywheel being arranged to reduce the braking torque exerted so as to relieve the skid condition.

4. A vehicle anti-skid braking system according to claim 3 in which the fluid passageway between said chamber portions is provided in the shaft.

5. A vehicle anti-skid braking system according to claim 3 in which the resilient means comprises a spring acting between the piston and the sleeve connected with the flywheel.

* * * * *